(12) United States Patent
Xin et al.

(10) Patent No.: US 11,336,361 B2
(45) Date of Patent: May 17, 2022

(54) MILLIMETER-WAVE NON-LINE OF SIGHT ANALYSIS

(71) Applicant: SONY GROUP CORPORATION, Tokyo (JP)

(72) Inventors: Liangxiao Xin, San Jose, CA (US); Sarankumar Balakrishnan, Buffalo, NY (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/945,755

(22) Filed: Jul. 31, 2020

(65) Prior Publication Data

US 2021/0126695 A1 Apr. 29, 2021

Related U.S. Application Data

(60) Provisional application No. 62/925,621, filed on Oct. 24, 2019.

(51) Int. Cl.
| | |
|---|---|
| *H04B 7/08* | (2006.01) |
| *H04B 17/318* | (2015.01) |
| *H04B 17/10* | (2015.01) |
| *H04B 17/364* | (2015.01) |

(52) U.S. Cl.
CPC ........... *H04B 7/086* (2013.01); *H04B 7/0828* (2013.01); *H04B 17/102* (2015.01); *H04B 17/318* (2015.01); *H04B 17/364* (2015.01)

(58) Field of Classification Search
CPC .... H04B 7/086; H04B 17/318; H04B 7/0828; H04B 17/102; H04B 17/364; H04B 7/0617
See application file for complete search history.

(56) References Cited

U.S. PATENT DOCUMENTS

| | | | | |
|---|---|---|---|---|
| 9,094,080 | B1* | 7/2015 | Xu | H04L 25/0212 |
| 10,263,763 | B2* | 4/2019 | Rappaport | H04B 10/90 |
| 10,616,774 | B2* | 4/2020 | Narasimha | H04W 16/18 |
| 2016/0269911 | A1* | 9/2016 | Cheng | H04W 16/18 |
| 2017/0302352 | A1* | 10/2017 | Islam | H04L 5/0048 |
| 2018/0034500 | A1* | 2/2018 | Choi | H04B 1/7083 |
| 2018/0054294 | A1* | 2/2018 | Rappaport | H04B 17/104 |
| 2020/0169895 | A1* | 5/2020 | Chen | H04B 17/3913 |
| 2020/0393532 | A1* | 12/2020 | Chae | G01S 5/0273 |
| 2021/0045085 | A1* | 2/2021 | Islam | H04L 5/0051 |
| 2021/0048502 | A1* | 2/2021 | Gummadi | G01S 5/10 |
| 2021/0099989 | A1* | 4/2021 | Handte | H04W 72/0446 |

FOREIGN PATENT DOCUMENTS

KR 20030052838 A 6/2003

OTHER PUBLICATIONS

Samimi, Matthew K. et al., "3-D Statistical Channel Model for Millimeter-Wave Outdoor Mobile Broadband Communications", arXiv:1503.05619v1 [cs.IT], Mar. 19, 2015, 7 pages.

* cited by examiner

*Primary Examiner* — Jean B Corrielus
(74) *Attorney, Agent, or Firm* — O'Banion & Ritchey LLP; John P. O'Banion

(57) ABSTRACT

Reducing the effects of path loss in millimeter wave (mm-Wave) directional communications by performing channel measurements estimating non-line of sight (NLOS) blockages, to determine angle-of-departure (AoD) and angle-of-arrival (AoA) and gain of identified paths so that directional antennas can be reconfigured to overcome unfavorable propagation conditions and reduce path losses.

41 Claims, 13 Drawing Sheets

— 130

---

Algorithm 1 Synthesize Omni-PDP

1: Input: $y(a,b,c)$
2: Output: omni-PDP: $y_{omni}$
3: initialize $y_{omni}$
4: $CV(a,b) \leftarrow \dfrac{\sqrt{var[y(a,b,i)]}}{<\sum_i y(a,b,i)>}$
5: $\alpha \leftarrow \arg\min \sum_b CV(a,b)$
6: align $y(a,b,c)$ with PDP sample $\alpha$
7: for $i \in y(i,b,c)$ do
8:    for $c$ do
9:       $y_{omni}(i,c) \leftarrow \max_b y(b,c)$
10:      $y_{omni}(i) \leftarrow <y_{omni}(i,c)>$
11:    end for
12: end for

Algorithm 2 Estimate $(\theta_{AoD}, \theta_{AoA})$

1: Input: P, G
2: Output: $\hat{\theta}_{AoD}, \hat{\theta}_{AoA}$
3: for $P_l \in P$ do
4:    for $\theta_{AoD} \in [-180, 180]$ do
5:       for $\theta_{AoA} \in [-180, 180]$ do
6:          $Y(\theta_{AoD}, \theta_{AoA}) \leftarrow \frac{1}{Ntx*Nrx} \sum_{i=1}^{Ntx*Nrx}(P_l - G)^2$
7:       end for
8:    end for
9:    $(\hat{\theta}_{AoD}, \hat{\theta}_{AoA}) \leftarrow \arg\min_\theta Y, \theta \in \{\theta_{AoD}, \theta_{AoA}\}$
10: end for

FIG. 8

SB, case 0, pdp sample 42:
estimated $(\theta_{AoD}, \theta_{AoA})$: (2,0), attenuation 54

SB, case 0, pdp sample 43:
estimated $(\theta_{AoD}, \theta_{AoA})$: (0,0), attenuation 36.5

SB, case 0, pdp sample 44:
estimated ($\theta_{AoD}, \theta_{AoA}$): (0,0), attenuation 47

SB, case 6, pdp sample 42:
estimated ($\theta_{AoD}, \theta_{AoA}$): (2,0), attenuation 55

SB, case 6, pdp sample 43:
estimated $(\theta_{AoD}, \theta_{AoA})$: (0,0), attenuation 38

SB, case 6, pdp sample 44:
estimated $(\theta_{AoD}, \theta_{AoA})$: (0,0), attenuation 47

MILLIMETER-WAVE NON-LINE OF SIGHT ANALYSIS

CROSS-REFERENCE TO RELATED APPLICATIONS

This application is a continuation of U.S. patent application Ser. No. 62/925,621 filed on Oct. 24, 2019, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to millimeter wave (mmWave) directional communication circuits performing channel measurements, and more particularly to directional mmWave communication circuits estimating non-line of sight (NLOS) paths so that directional antennas can be configured to overcome adverse propagation conditions.

2. Background Discussion

Ever increasing demands exist for very high data rate applications in the millimeter wave (mmWave) communication arena, including 802.11ad/ay for WiFi, while 5G for cellular networks is a promising technology in view of its high bandwidth availability.

Yet, mmWave systems generally utilize directional antennas for overcoming unfavorable propagation scenarios which result from high path loss at mmWave frequencies. It should be appreciated that this path loss not only involves stationary structures, but dynamic elements, which include humans blocking one or more signal path(s). It is thus important to understand channel dynamics at mmWave frequencies, when designing and configuring reliable communication systems.

Accordingly, a need exists for enhanced mechanisms for estimating channel dynamics to more efficiently utilize directional mmW communications. The present disclosure fulfills these needs and provides additional benefits over previous technologies.

BRIEF SUMMARY

In order to overcome high path loss at millimeter wave (mmWave) frequencies a number of mmWave communication circuits rely on directional antennas. However, path losses can also be reduced by altering antenna configurations in response to measured channel measurements which map ray paths toward optimal directions, identify feasible propagation paths (e.g., in response to blockage of LOS path) and infer multipath parameters, such as angle-of-departure (AoD) and angle-of-arrival (AoA) of the identified paths. The present disclosure also allows determining arrival statistics of ray paths for antenna arrays having irregular beam patterns.

By way of example and not limitation, the present disclosure is applicable to mmWave frequencies, with a specific case given of 60 GHz. However, the teachings of the present disclosure are generally applicable to frequencies in the range from 30 to 300 GHz. The examples are directed to those within an enclosed space, such as an indoor living room, or other room within a structure. The disclosure is application for estimating non-line of sight (NLOS) propagation in various mm-Wave, Wi-Fi, and wireless networking scenarios, and finding practical alternatives to the LOS path in the event of blockage.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 6 are method steps for synthesizing omni-PDP according to an embodiment of the present disclosure.

FIG. 8 are method steps for estimating angles AoD, AoA according to an embodiment of the present disclosure.

DETAILED DESCRIPTION

1. Introduction and Scenario

The present disclosure utilizes an indoor room (e.g., living room) as its example for performing channel measurements in devising a method for understanding and estimating channel parameters, such as angle-of-departure (AoD), angle-of-arrival (AoA), line-of-sight, and non line-of-sight paths.

A method is described for deriving omni-directional power delay profiles (omni-PDPs) from directional PDP measurements, and for inferring AoD, AoA and ray path information from measured channel data. The method has also been validated based on comparing signal measurements versus ray tracing simulations.

Figure 1:
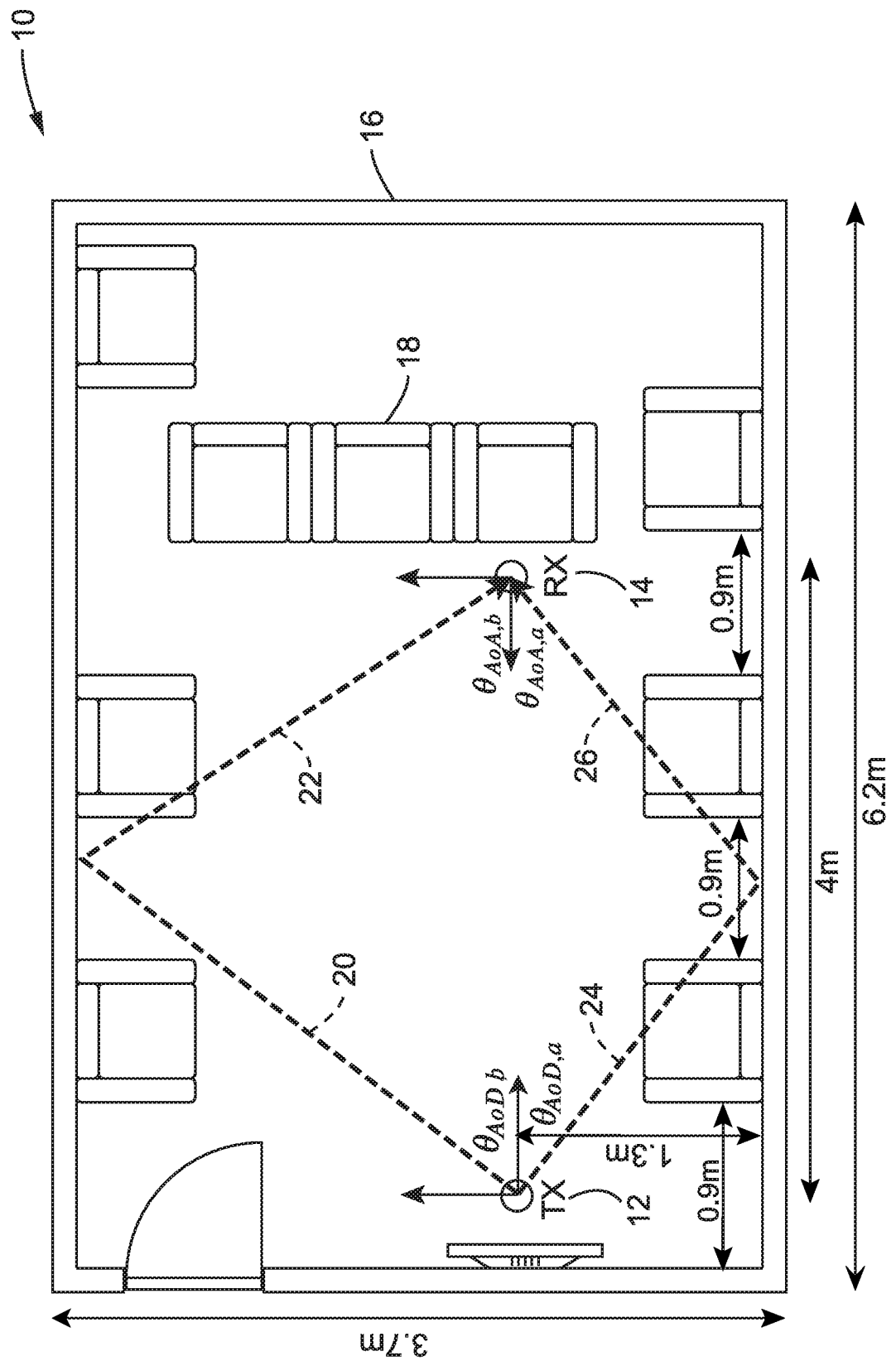
FIG. 1 is a plan view of an example enclosed space topology, which in this case is shown with a first station and second station in a room having boundaries (walls) and obstructions (furniture).

FIG. 1 illustrates an example venue 10 within which channel sounding measurements were performed using mmWave communication stations having phased array antennas. By way of example and not limitation, the specific hardware utilizes 60 GHz phased arrays, although the present disclosure is generally applicable to the mmW range from 30 to 300 GHz. The example floor plan depicts a room 16 which is 3.7 m by 6.2 m, with the transmitter (TX) 12 and receiver (RX) 14 separated by 4 m. For the sake of simplicity of description the discussions herein speak of the TX and RX separately, whereas each actual station in a network is typically configured with transceivers (TX/RX) which selectively perform TX and RX directed by a communications protocol in communicating with other nearby stations. Within the measurement venue are obstructions which primarily consist of furniture for seating 18 and a television 19.

The TX and RX in this example are placed in a line-of-sight (LOS) orientation with respect to each other, but can be subject to blocking, such as from human blocking. It will be appreciated that a LOS path is not always available, and the present disclosure can provide benefits whether or not an initial LOS path is available. By way of example and not limitation, the example depicts the TX and RX at a height of 1 m from the floor and at a distance of 4 m from each other. The example station is considered to utilize a 60 GHz phased array having 12 antenna patterns at the transmitter and 12 antenna patterns at the receiver. However, it should be appreciated that the present disclosure is applicable to stations having any desired number of antenna patterns (e.g., less than or more than the exemplified antenna patterns).

The channel measurements are performed for all combinations of these example antenna patterns resulting in 144 sets of channel measurements by way of example and not limitation, with the measurement process being repeated a large number of times (e.g., 1750 times) for each case. For each antenna pattern combination, a plurality of (e.g., 192) time-domain PDP samples are obtained. The PDP samples contain the magnitude and delay of each of the paths. It should be appreciated that the value for number of sets, times per case and number of time-domain PDP samples were chosen to provide a representative test, while in no way limiting the values that can be chosen for these parameters when utilizing the teachings of the present disclosure.

The measured PDP data is stored as a 4D-tensor with dimensions N×Nrx×Ntx×Nscans where N is the number of PDP samples, Nrx and Ntx are the number of TX and RX antenna patterns, and Nscan is the number of repetitive measurements. By way of example and not limitation, measurements were performed for seven different scenarios, each with the antenna array directed in different directions.

Figure 2:
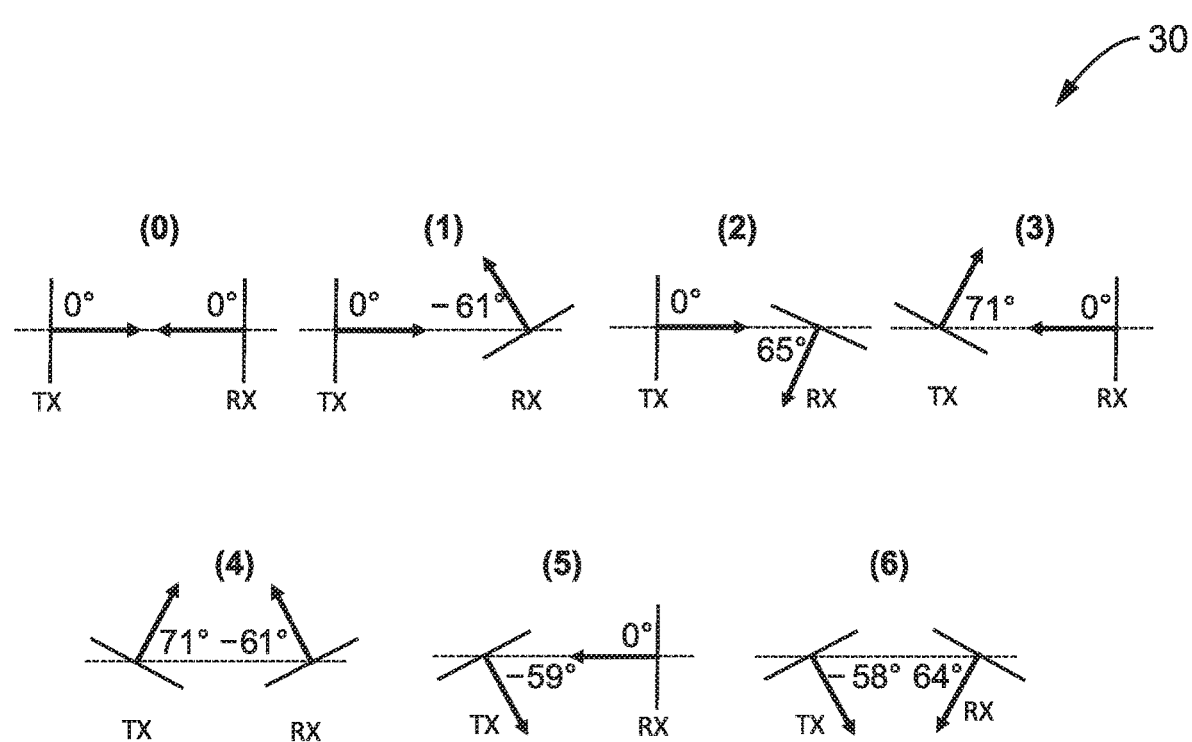
FIG. 2 is a plan view of seven different TX to RX scenarios which were considered during evaluation of the present disclosure.

FIG. 2 illustrates an example embodiment 30 of different antenna pointing relationships which were considered in the present testing. These antenna relationships were chosen to obtain a representative sample of antenna directions for the testing, while the present disclosure is applicable to communications systems having any desired level of antenna direction resolution. The rotation is positive when the antenna gimbal is rotated counter-clockwise with respect to its axis of rotation and negative otherwise. These examples are shown as TX and RX direction pairs as: (0) 0°, 0°; (1) 0°, −61°; (2) 0°, 65°; (3) 71°, 0°; (4) 71°, −61°; (5) −59°, 0°; and (6) −58°, 64°. For each of the seven scenarios, two sets of similar experiments were considered which we refer to herein as cases. So, in total seven scenarios and two cases of each scenario was considered in these tests.

It should be appreciated that the antenna direction control represents the type of antenna direction control utilized in a wide range of modern mmW communications stations.

2. Station (STA) Hardware Configuration

Figure 3:
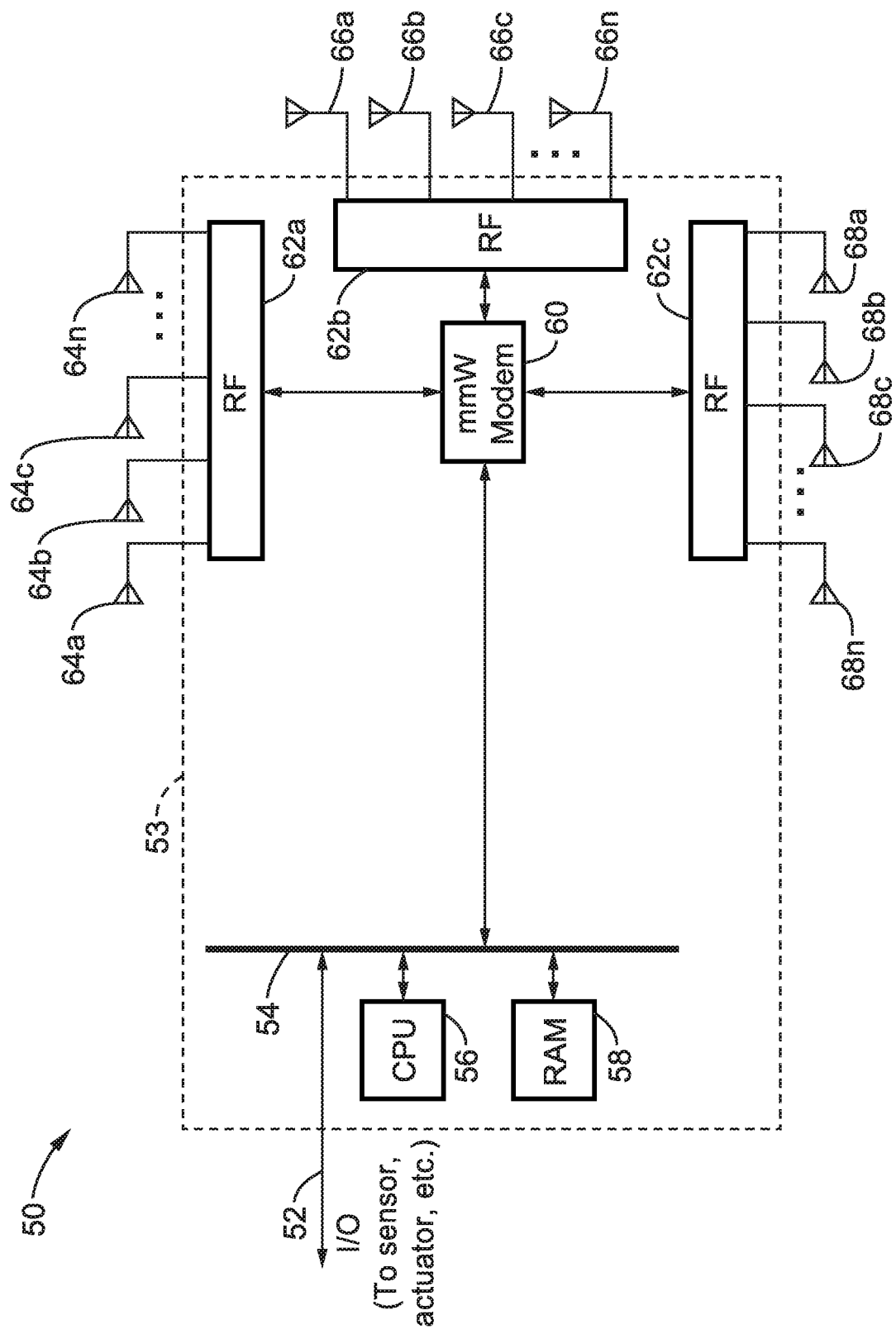
FIG. 3 is a block diagram of example wireless mmW communication station hardware according to an embodiment of the present disclosure.

FIG. 3 illustrates an example embodiment 50 of a hardware configuration for a mmWave station (STA) showing I/O path 52 connecting into hardware block 53, having a computer processor (CPU) 56 and memory (RAM) 58 coupled to a bus 54, which is coupled to I/O path 52 giving the STA external I/O, such as to sensors, actuators and so forth. Instructions from memory 58 are executed on processor 56 to execute a program which implements the communication protocols, as well as the NLOS measurements which can inform the decisions of the protocol and the hardware configuration. It should also be appreciated that the programming is configured to operate in different modes (e.g., transmit, receive, source, intermediate, destination, AP, non-AP and so forth), depending on what role it is playing in the current communication context.

This host machine is shown configured with an antenna array. A mmWave modem 60 is coupled to radio-frequency (RF) circuitry 62a, 62b, 62c which is connected to a plurality of antennas 64a through 64n, 66a through 66n and 68a through 68n to transmit and receive frames during communications with neighboring STAs, and to gather information for the NLOS analysis. It should be noted that station hardware may be configured with multiple modems, such as on different frequencies, and any desired structuring of the antennas in one or more antenna arrays may be utilized without departing from the teachings of the present disclosure. Thus, although three RF circuits are shown in this example for the mmW band, embodiments of the present disclosure can be configured with modem 60 coupled to any arbitrary number of RF circuits. In general, using a larger number of RF circuits will result in broader coverage of the antenna beam direction. It should be appreciated that the number of RF circuits and number of antennas being utilized are generally determined by hardware constraints of a specific device. Some of the RF circuitry and antennas may be disabled when the STA determines it is unnecessary to communicate with neighbor STAs. In at least one embodiment, the RF circuitry includes a frequency converter, array antenna controller, and so forth, and is connected to multiple antennas which are controlled to perform beamforming for transmission and reception. In this way the STA can transmit signals using multiple sets of beam patterns, with each beam pattern direction being considered as an antenna sector.

Figure 4:
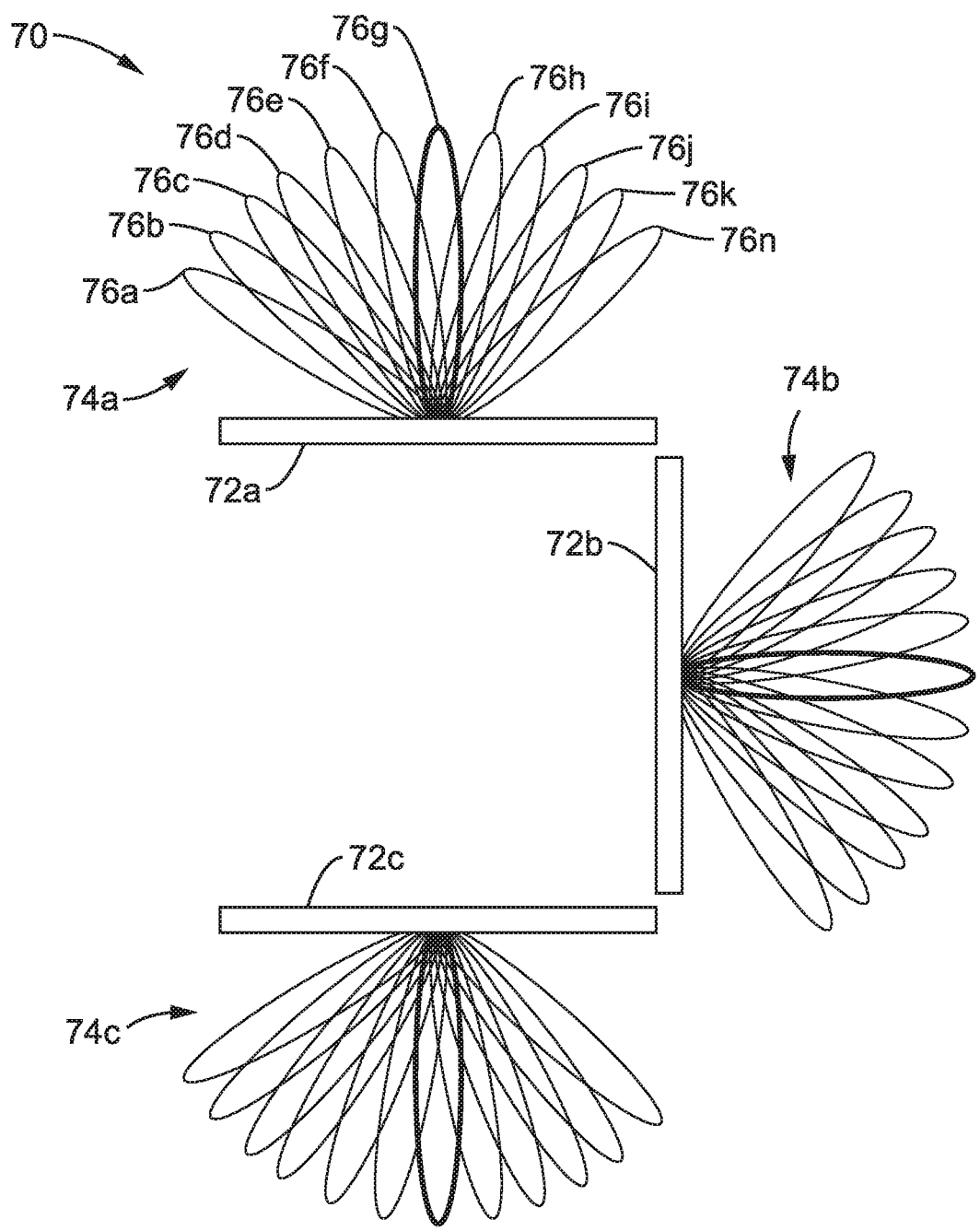
FIG. 4 is a mmW beam pattern diagram for the station hardware of FIG. 3 as can be utilized according to an embodiment of the present disclosure.

FIG. 4 illustrates an example embodiment 70 of mmW antenna directions which can be utilized by a STA to generate a plurality (e.g., 36) of mmW antenna sector patterns. In this example, the STA implements three RF circuits 72a, 72b, 72c and connected antennas, and each RF circuitry and connected antenna generate a beamforming pattern 74a, 74b, 74c. Antenna pattern 54a is shown having twelve beamforming patterns 76a, 76b, 76c, 76d, 76e, 76f, 76g, 76h, 76i, 76j, 76k and 76n ("n" representing that any number of directions can be supported). The example station using this specific configuration has thirty six (36) antenna sectors, although the present disclosure can support any desired number of antenna sector directions. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

The choice of antenna sector is determined by a selection of mmW RF circuitry and beamforming commanded by the mmW array antenna controller. Although it is possible that STA hardware components have different functional partitions from the one described above, such configurations can be deemed to be a variant of the explained configuration.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

3. Omni-Directional PDP and Ray Path Inference

At mmWave frequencies the channel measurements are typically performed using directional antenna patterns to overcome high attenuation. Typically mmWave devices use multiple beam patterns $b_i$ where i is the index of the beam pattern, each pointing towards a specific direction. For each of the combination of beam patterns $b_i$ at the transmitter and the receiver, a time domain channel response called a power delay profile (PDP) is obtained. The channel response is given by:

$$H(i,j) = \Sigma_{l=0}^{L-1} \alpha_{i,j}(l) g_{Tx,1}(\theta_{AoD}) g_{Rx,1}(\theta_{AoA}) \delta(\tau(i,j) - \tau_1(i,j)),$$

where i, j represent the beam pattern at the TX and RX respectively, L is the number of multipath components, $\alpha(i,j)$ the attenuation of the path, $g_{Tx,1}(\theta_{AoD})$ is antenna pattern gain at AoD, and $g_{Rx,1}(\theta_{AoA})$ is antenna pattern gain at AoA. Value $\tau_l$ is the delay of path l. H(i,j) depends on the directional beam pattern at the TX and RX. These directional channel measurements provide very limited information about feasible paths available between the transmitter and receiver.

A beam pattern pointing toward a specific direction amplifies the available ray path in that direction and suppresses other ray paths in the direction of the side lobes. Therefore to infer all the feasible ray paths between the transmitter and the receiver, it is necessary to combine the directional PDPs to obtain the omni-directional PDP. A feasible path from the TX to RX might be covered by multiple beam pattern combinations i, j. Among these, one of the combinations of beam patterns will provide the maximum received power for that path. Therefore path l can be selected by:

$$P_l = \max_{i,j} p_l(i,j).$$

It should be noted that due to the timing synchronization error between the TX and the RX, the PDP samples across multiple scans may not be aligned. For example, the LOS sample could shift a few samples across multiple scans. To solve this issue, the present disclosure utilizes the following method. Let y(a,b,c) be the received signal level of a PDP sample a, antenna pattern combination b, and scan C. Then the LOS PDP sample is obtained by:

$$\alpha = \arg\min \Sigma_b CV(a,b)$$

where CV is the coefficient of variance defined as:

$$CV(a,b) = \frac{\sqrt{\mathrm{var}[y(a,b,i)]}}{\left\langle \sum_i y(a,b,i) \right\rangle}.$$

The PDP samples across scans are aligned based on angle $\alpha$. The synthesized omni-PDP is further refined by taking the dynamic range of the receiver into account. Any path which is 30 dB lower than the maximum peak is discarded.

Figure 5:
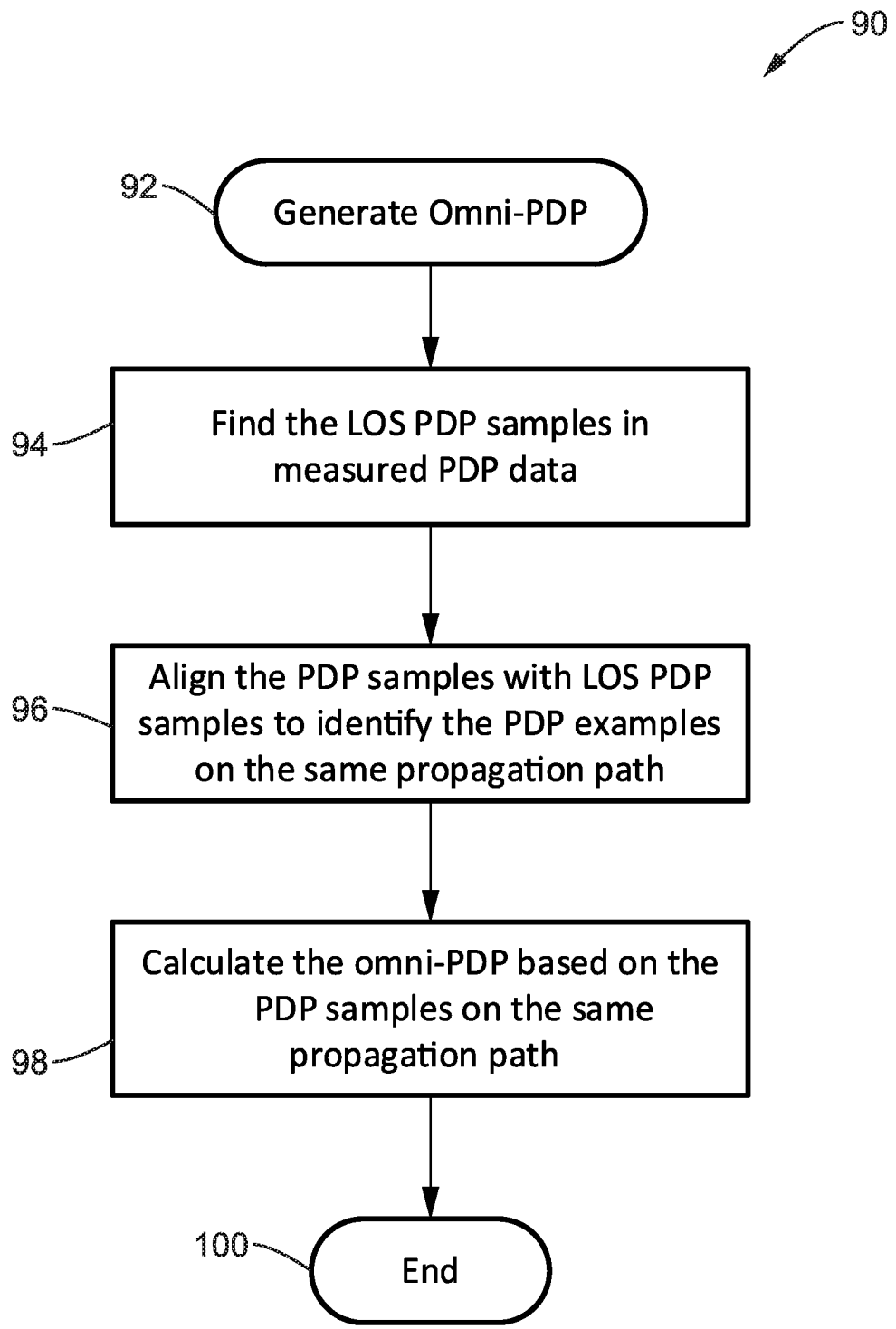
FIG. 5 is a flow diagram of synthesizing omni-PDP according to an embodiment of the present disclosure.

FIG. 5 illustrates a flow diagram 90 for generating an omni-PDP. Execution commences 92, and the LOS PDP finds samples 94 across a range of antenna pattern combinations, such as exemplified in FIG. 2, among the measured PDP data. Then the PDP samples are aligned 96 with LOS PDP samples since the signal propagation time from the transmitter and the receiver on LOS is constant. Since the sampling time is deterministic, the number of PDP samples between a PDP sample and the LOS PDP sample, is denoted by LOS PDP gap, represents the additional signal propagation time over a NLOS path for that PDP sample compared with the signal propagation time over LOS path. Therefore, if two PDP samples have the same LOS PDP gap, then they are propagated through the same path over the air. Then, the omni-PDP is calculated 98 based on the PDP samples on the same propagation path.

FIG. 6 illustrates an example algorithm 130 configured as one solution to implementing omni-PDP. The inputs are shown in line 1 of the figure as being measured PDP data, with an output of omni-PDP as seen in line 2. In lines 4-5 is seen the step of finding the LOS PDP samples in the measured PDP data. Line 6 performs aligning the PDP samples with LOS PDP samples. Lines 7 and onward calculate the omni-PDP per the PDP samples.

3.1. Ray Path Inference.

In this section, is described a procedure to determine the AoA and AoD of ray paths from the measurement PDP samples. It should be recalled that PDP measurements are 4-tuple N×Nrx×Ntx×Nscans. The objective is to infer the $\theta_{AoD}$, $\theta_{AoA}$ of individual paths. The received power of a ray path $P_l = (i,j)$ for an antenna pattern i at TX and j at RX is a function of antenna gain due to $\theta_{AoD}$ at the TX and antenna gain due to $\theta_{AoA}$ at RX subject to propagation losses (PL).

$$P_l(i,j) = P_{Tx} + g_{Tx,i}(\theta_{AoD}) + g_{Rx,j}(\theta_{AoA}) - PL,$$

where $P_{Tx}$ is the transmit power, $g_{Tx,i}(\theta_{AoD})$ is the gain of the ith TX beam pattern at $\theta_{AoD}$ and $g_{Rx,j}(\theta_{AoA})$ is the gain of the jth RX beam pattern at $\theta_{AoA}$. It should be appreciated that, for path $p_l(j,k)$ the losses due to ray path length and material reflection are constant, and the only variables are antenna gains $g_{Tx,i}(\theta_{AoD})$ and $g_{Rx,j}(\theta_{AoA})$ due to TX and RX antenna patterns, respectively.

In the present example the TX and RX each use 12 antenna patterns, thus resulting in 144 received power measurements for each path 1. Therefore, let $P_l$ be the vector of received powers of path l for all antenna pattern combinations and the gain is determined.

$$P_l = [p_l(1,1), p_l(2,1), \ldots, p_l(12,12)]^T \cdot G =$$
$$\begin{bmatrix} g_{Tx,1}(\theta_{AoD}) * g_{Rx,1}(\theta_{AoA}), g_{Tx,2}(\theta_{AoD}) * g_{Rx,2}(\theta_{AoA}), \\ \ldots, g_{Tx,12}(\theta_{AoD})(g_{Rx,12}(\theta_{AoA}), \end{bmatrix}^T$$

Thus, G is the vector of total gain due to 144 combinations of TX and Rx antenna patterns at $\theta_{AoD}$ and $\theta_{AoA}$. It should be noted that the received power vector $P_l$ includes the contribution resulting from propagation loss. To remove any contribution due to propagation of the path, a z-score normalization of $P_l$. Let P represent the matrix that holds $P_l$ for all the paths. The objective is to minimize the distance between G and $P_l$ for a path l.

Figure 7:
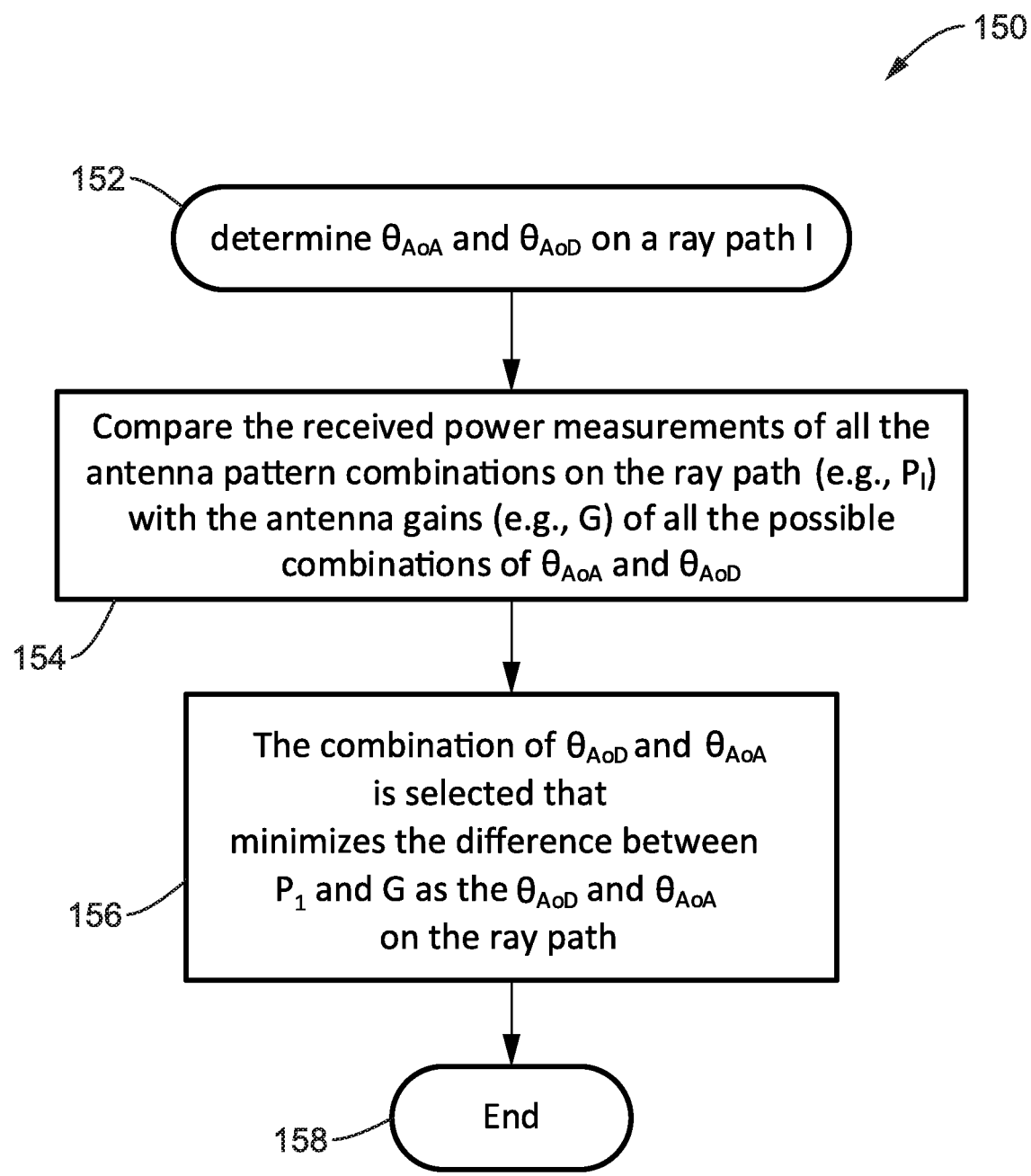
FIG. 7 is a flow diagram of estimating angles AoD, AoA according to an embodiment of the present disclosure.

FIG. 7 illustrates an example embodiment 150 for determining the AoA and AoD of ray paths from the measurement PDP samples. The process starts 152 determining each possible combination of $\theta_{AoD}$ and $\theta_{AoA}$, with the antenna gains G being calculated. Then, the gains are compared 154 based on received power measurements across all antenna pattern combinations on each ray path l, i.e., $P_l$. After comparing $P_l$ with gain G of all the possible combinations of $\theta_{AoD}$ and $\theta_{AoA}$, then a combination is selected 156 of $\theta_{AoD}$ and $\theta_{AoA}$ that has minimum difference between $P_l$ and G as the $\theta_{AoD}$ and $\theta_{AoA}$ on that ray path, before processing ends 158.

FIG. 8 illustrates an example embodiment of method steps 190 for determining the AoA and AoD of ray paths from the measurement of PDP samples on multiple paths. It is seen in the figure that lines 4-7 compare the received power measurements of all the antenna pattern combinations on the ray path (e.g., $P_l$) with the antenna gains (e.g., G) of all the possible combinations of $\theta_{AoD}$ and $\theta_{AoA}$. Line 9 shows selecting a value for $\theta_{AoD}$ and $\theta_{AoA}$ which minimizes the difference between $P_l$ and G on the ray path.

4. Inference and Validation

In this section, measurement data is analyzed using the method seen in the prior section. First, the omni-PDPs for each of the seven scenarios are obtained. The obtained ray path information is then validated using ray path information obtained from channel sounding data with a ray tracing simulation using Scenargie® ray tracing simulator. It will be noted that Scenargie is a well known network simulation package allowing various systems to be analyzed and evaluated over a range of scenarios. The measurement venue is replicated in the simulation, such as using parameters given in Section 2. The simulator takes the position of TX and RX, environment geometry and material characteristics (i.e., relative permittivity, conductivity and thickness of the material) as input and can yield all the viable ray paths between the TX and RX. By way of example and not limitation, the material parameters for the walls of the room were exemplified as follows: material type is drywall, dielectric layer is layered dielectric, permittivity is 2.1, conductivity is 0.21 (S/m) and wall thickness is 1 m.

After obtaining ray path information a simulation was performed to calculate the RSSI at the receiver for each combination of antenna pattern $b_i$. The measured PDPs were compared with the ray tracing simulation. The ray tracing simulator produces PDPs for omni-directional antenna patterns. Antenna directivity gains are applied to the omnidirectional ray tracing PDPs. From the data collected it was found that the estimated omni-PDPs matched very well with the simulated PDPs for all the scenarios. For all the scenarios, two prominent ray paths were identified, one of which is LOS. The path delay difference of the NLOS ray path with respect to the LOS ray path is shown in Table. 1. It is seen that two NLOS paths are distinct. One of the paths is with a delay of 2.4 ns with respect to the LOS path and the other has a delay of 7.2 ns with respect to the LOS path. Due to the asymmetry in the TX and RX placement in the venue, it can be seen in FIG. 1 that one of the NLOS path is shorter than the other. In the next step the AoD and AoA are identified for each individual path from the PDP through using the method shown in FIG. 7 and FIG. 8.

It should be noted that the method relies on computing received power of the paths and the measured antenna pattern. The measurement system used for channel measurements introduces noise which must be removed. The noise power is estimated based on the assumption that the first few samples of the PDP represent a noise contribution. In all of our testing, it was observed that the LOS path (or the first path) arrives after the 35th PDP sample. The noise power is calculated as:

$$P_{noise} = \Sigma_n P_i(j,k)/N$$

where N is the total noise samples considered which is 10. This noise power is subtracted from all the PDP samples. The received power of a path i for TX antenna pattern j and RX antenna pattern k is calculated as:

$$P_r(i,j) = \Sigma_n P_i(j,k)/N$$

where N is 1750 in this example. A vector of received power for all 144 antenna pattern combinations of path i is computed, which along with the antenna pattern is given as input into the method seen in FIG. 7 and FIG. 8. This process is repeated for all the paths in the PDP.

Testing was performed to obtain RSSI versus antenna combination for all the identified paths in the seven scenarios. A very good match was found between the RSSI vector from the measurement and the RSSI vector obtained from $G_{TX}(\theta_{AoD}) G_{RX}(\theta_{AoA})$ at the estimated $\theta_{AoD}$ and $\theta_{AoA}$. From the ($\theta_{AoD}$, $\theta_{AoA}$) estimation of the paths in the measurement data, it can be inferred that for the living room scenario shown in FIG. 1, the reflections off the side walls contribute to the majority of received power of the NLOS paths from the TX to the RX. Owing to the fact that the TX and RX are placed closer to one wall than the other, the reflections off the wall closer to the TX and RX is much stronger than the reflection from the further wall. Table 1 also shows the received power of LOS path and NLOS path for each of the scenarios and cases considered. With an $\theta_{AoD}$ and $\theta_{AoA}$ of (−37°, 37°) for the reflection off the closest wall, the corresponding difference in received power with respect to LOS is 9:5 dB. The received power difference for the path with an $\theta_{AoD}$ and $\theta_{AoA}$ of (−54°, −51°) is 10:2 dB. The path reflected off the wall closer to the TX and RX suffers an average power loss of 9 dB due to propagation and reflection and the other path suffers an average power loss of 13 dB. For the environmental geometry under consideration, the reflected paths are viable alternatives to LOS in the event of blockage to LOS path. The average RSSI of the shortest reflected path is 52:4 dBm and the average RSSI of the path reflected off the furthest wall is 57:6 dBm, which are sufficient to establish a link between TX and RX.

Table 1 depicts estimated ($\theta_{AoD}$, $\theta_{AoA}$) for LOS and NLOS ray paths for the example cases and time delay for NLOS ray paths with respect to LOS.

5. Human Blockage Analysis

Having identified and analyzed the significance of NLOS paths on the received power in an indoor scenario, in this section is described the impact of a human blocker on the received signal power for different scenarios shown in FIG. 2, for the floor plan seen in FIG. 1. In the example of FIG. 1 a human blocker is considered to be moving perpendicular from the wall that is directly in front of the TX toward the wall that is to the left of the TX. The human is walking at an equidistant from the TX and RX.

By way of example and not limitation the effects of the human blocker are studied through ray tracing simulations using Scenargie. The Scenargie simulator parameters utilizes are those previously discussed herein. The human blocker parameters are set as follows. The width and length of the human are both exemplified as 0.5 m, with a height of human is 1.8 m. The surface parameter and the surface loss exemplified as 0.1 m and 6 dB respectively. The inner loss is exemplified as 22 dB, which is calculated as an average received power over the blockage region in the experimental data set.

In the simulation, the human blocker is placed in a stationary position at the LOS between the TX and RX blocking the LOS path for the sake of simplicity of demonstration. So in the dataset utilized in testing the present disclosure only the region where the human is in the LOS of the TX and RX is considered. During the LOS blockage by the human blocker, the NLOS paths contribute to the received signal power at the RX. The testing found that the resulting received power at the RX when the LOS is blocked by the human had very good agreement between the measurements and the simulation. This demonstrates that the blockage model with the obtained ray path information and material parameters are sufficiently accurate to model the impact of the human blocker. In addition, the tests found that in the event of human blockage in the LOS path, it is possible to maintain communication through NLOS paths by switching the beams.

6. NLOS Analysis

The following describes performing an NLOS analysis for the multipath blocker scenario, so as to match with Scenargie® results.

The high level steps in performing this NLOS analysis are given by the following. (a) Isolate the NLOS rays from the measurement and find angle-of-departure (AoD), angle-of-arrival (AoA) and path length. (b) Calibrate the material parameters based on the NLOS rays. (c) Compare between measurements of NLOS and calibrated NLOS in Scenargie. (d) Adjust antenna configuration(s) to map ray paths toward optimal directions, identified feasible propagation paths based on inferring multipath parameters such as angle-of-arrival, and angle-of-departure of the identified paths.

Before performing the steps above, it is preferably determined if the NLOS paths are stable and trustable. Thus, omni-PDP is synthesized from directional PDP measurements to better understand the scenario and environment, and eliminate ghost paths. It should be appreciated that the term "Ghost" in regard to signals or paths derived is a term derived from observing ghost like artifacts arising on analog television receivers when the received signals included reflected signals.

6.1. Stability of NLOS Paths

Figure 9:
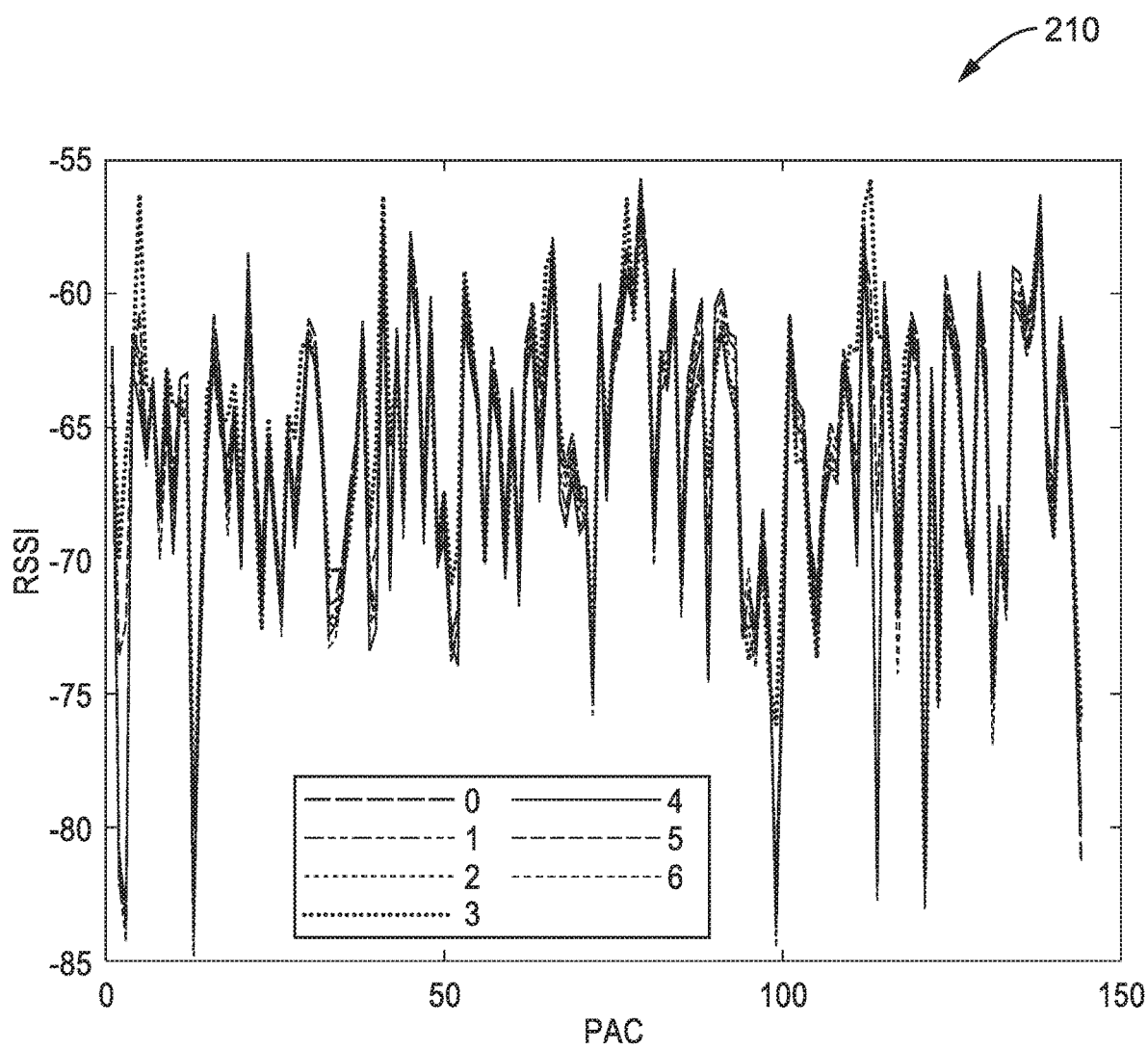
FIG. 9 is a plot of Relative Received Signal Strength (RSSI) for specific reflection path in FIG. 1 checked over each of the seven TX to RX scenarios seen in FIG. 2.

FIG. 9 illustrates an example 210 non-line of sight (NLOS) path, in particular NLOS path #46, which was the path reflected off the wall to the right of transmitter 12 which is the wall at the bottom of the figure, showing overlapping plots of NLOS for a representative antenna orientation of TX0 to RX0 and cases 0 to 6.

In the measurement it is seen that the plots for each of the different cases (case 0 to case 6) substantially overly one another, the plots are generally so close that the plot actually appears like a thicker line. It should be appreciated that the original figure was in color and one could see very slight colors bands on certain edges of the plots. This and additional testing has shown that NLOS components are stable. Additional testing was performed in relation to different antenna orientations, wherein it was found that the NLOS path was stable for all other antenna orientations as well.

After determining that the NLOS components are stable, the next step is in identifying the dominant NLOS for the environment under consideration.

The PDPs comprise directional PDPs meaning that a PDP is obtained for each antenna pattern combination, which in the present example involves a total of 144 combinations, as there were 12 antenna patterns at each the transmitter and receiver. Directional PDP provides ray path information for the directions in which the TX and RX beam patterns are pointing. Ray paths which trace other directions are suppressed due to side lobes. Thus, it is necessary to combine all the directional PDPs to obtain an omni-PDP that best represents the environment and scenario.

Figure 10A:
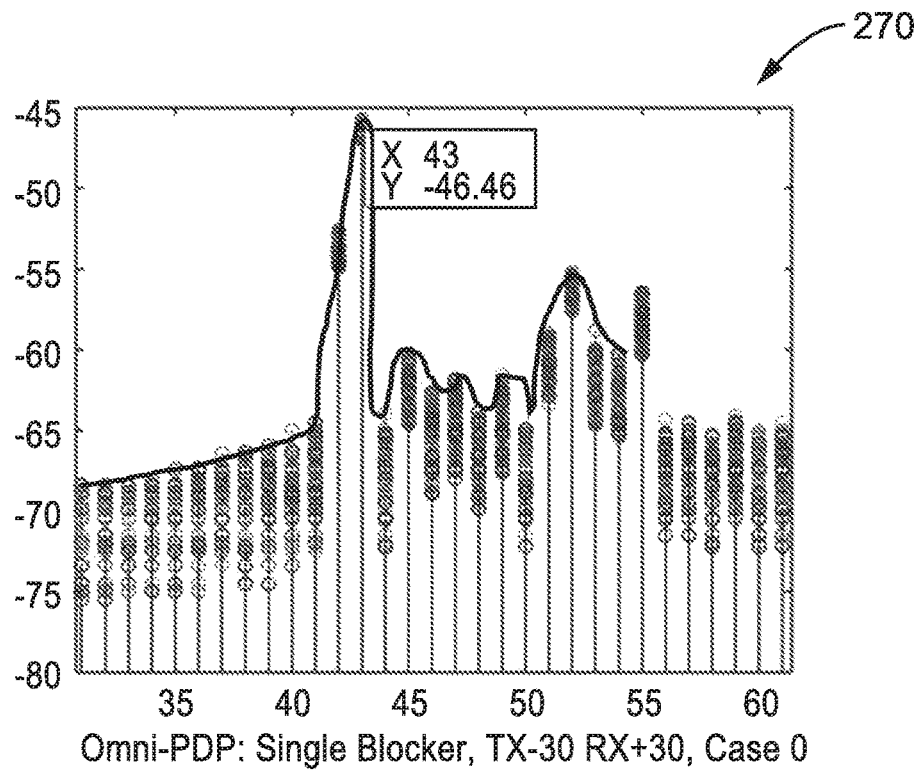
FIG. 10A and FIG. 10B are plots of RSSI for two different example scenarios of omni-directional power delay profile (PDP) with single blocker each comprising 1750 scans.
Figure 10B:
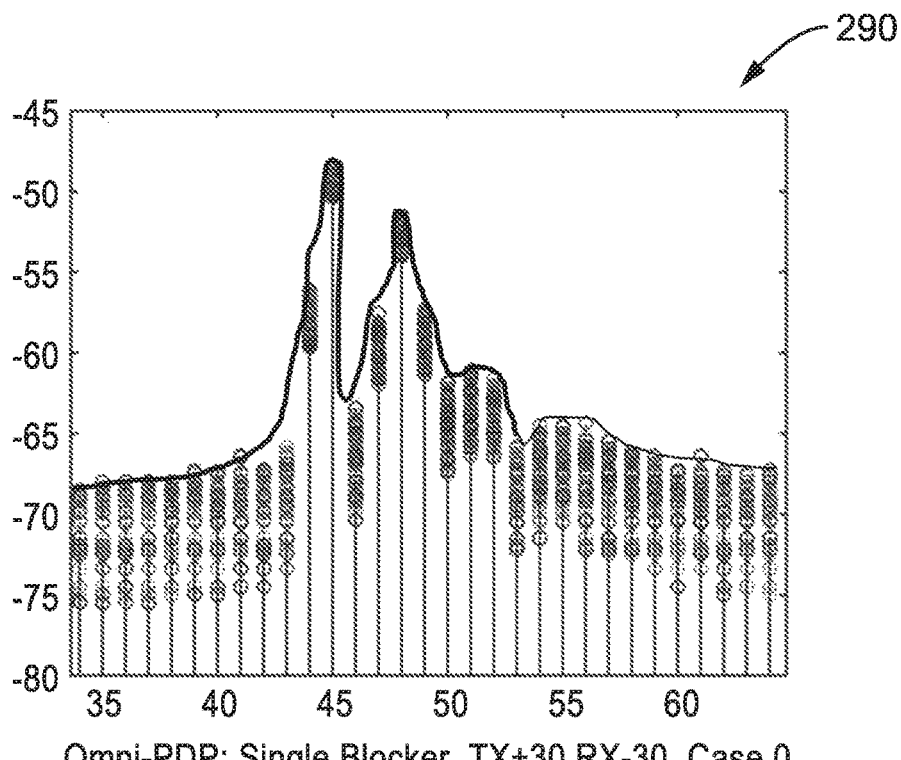

FIG. 10A and FIG. 10B illustrate example omni-PDP results 270, 290 for two example scenarios, one with transmitter/receiver orientations at −30°, +30°, respectively and one with orientations at +30°, −30° respectively. For each scenario, all 1750 scans are represented by the shaded circles (these were colored circles in the original figure). It can be seen from the figures that the PDP envelope has the shape of a filter response which indicates a single viable ray path could be represented by multiple PDP samples; which is due to the fact that a convolutional filter is used to estimate the PDP.

Figure 11A:
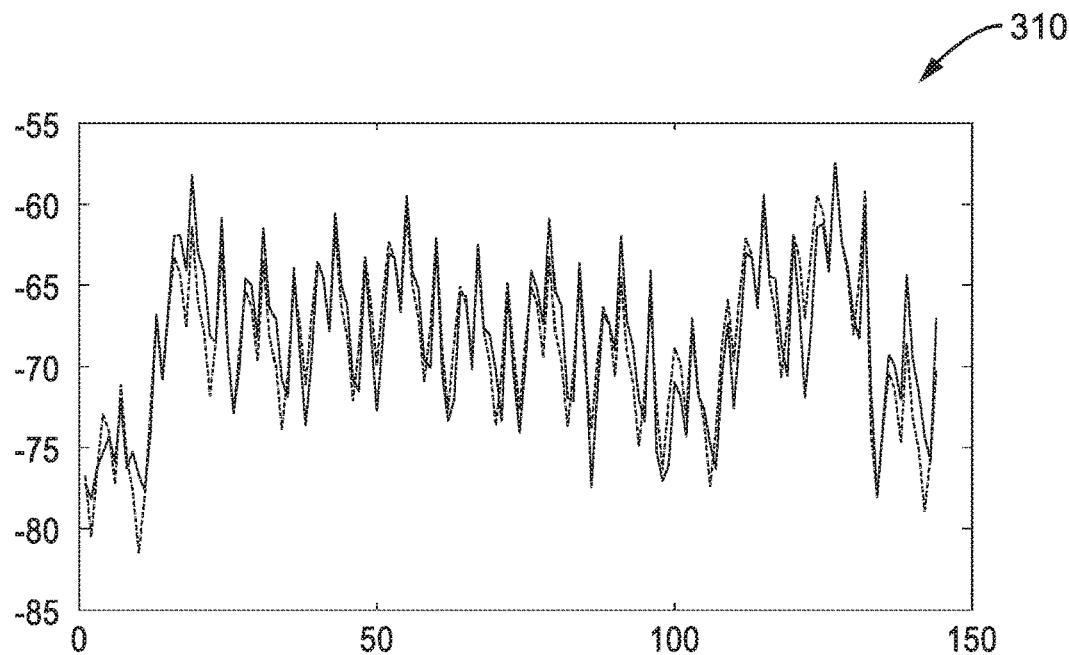
FIG. 11A through FIG. 11F are plots of RSSI versus antenna pattern combinations for four PDP samples and two example cases of single blocker scenario TX0 RX0.
Figure 11B:
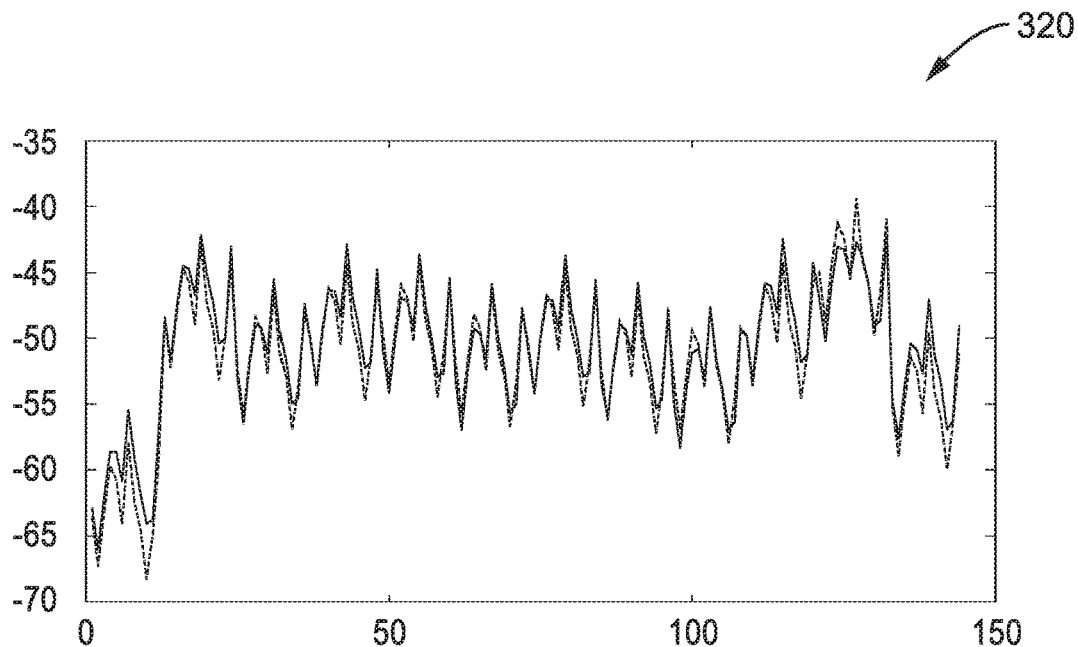
Figure 11C:
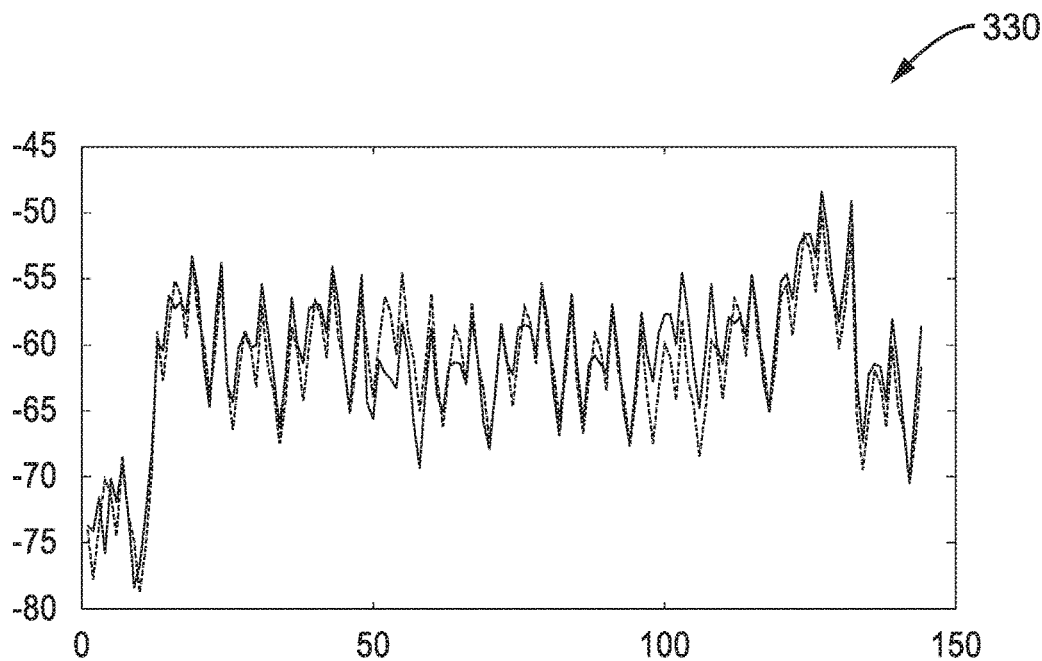
Figure 11D:
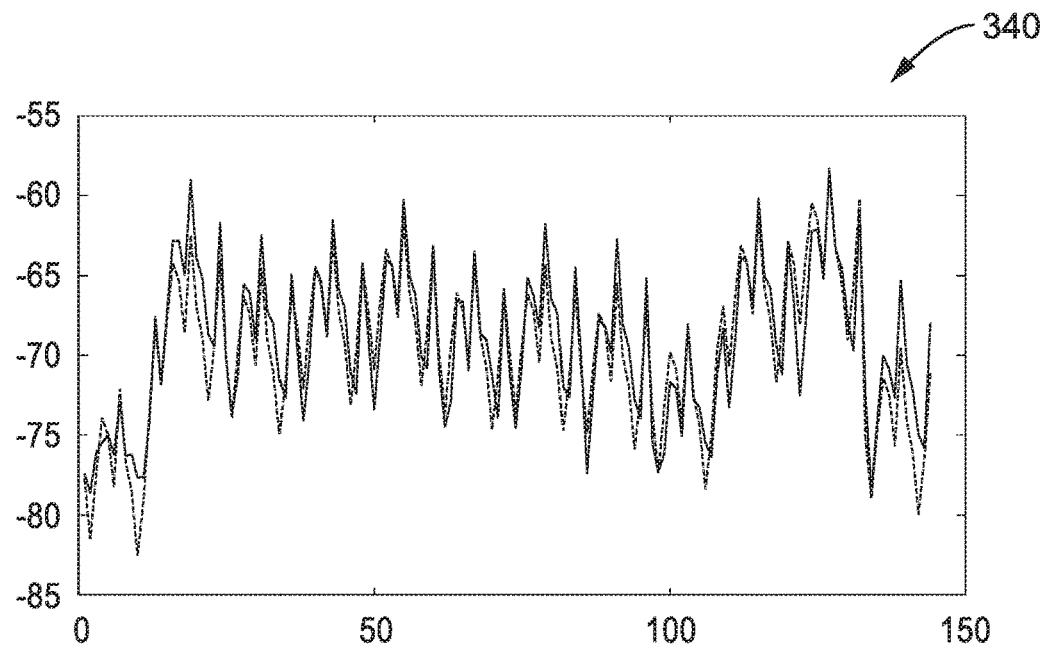
Figure 11E:
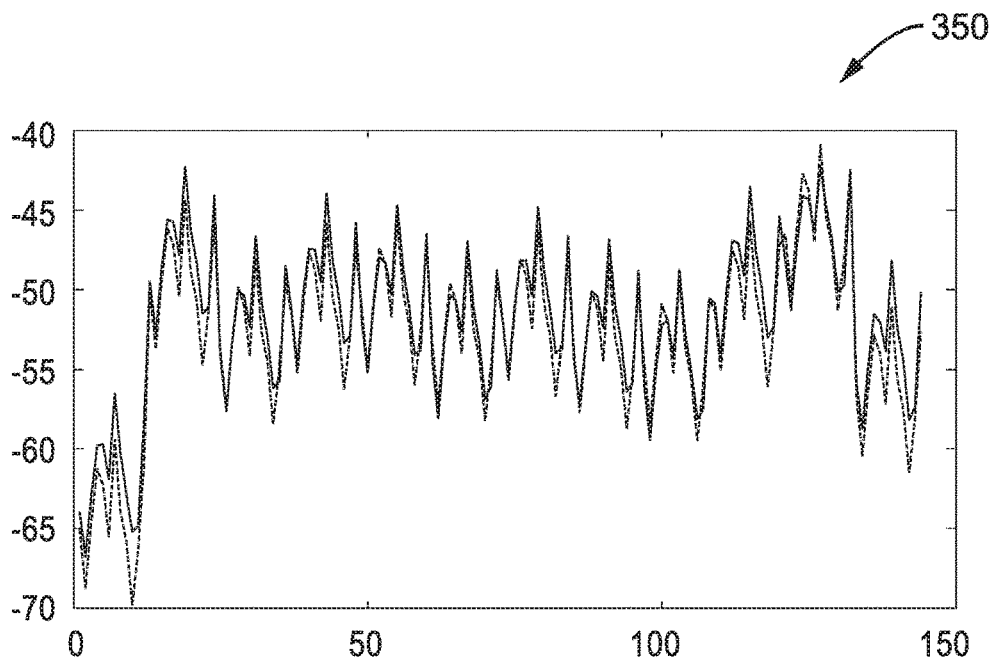
Figure 11F:
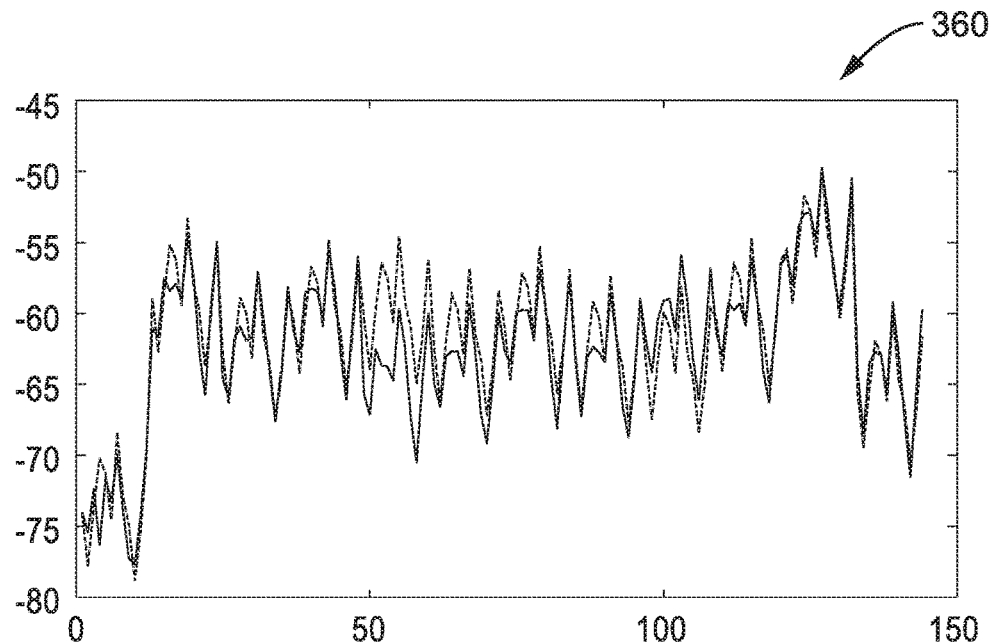

FIG. 11A through FIG. 11F illustrate results 310, 320, 330, 340, 350 and 360 from an example embodiment of single blocker (SB) scenarios using filters in estimating PDP in determining if the LOS and NLOS are truly represented by a single sample. In FIG. 11A depicts a case 0 PDP sample #42 with estimated $(\theta_{AoD}, \theta_{AoA})$: (2,0), and attenuation 54. FIG. 11B depicts a case 0 PDP sample #43 with estimated $(\theta_{AoD}, \theta_{AoA})$: (0,0), and attenuation 36.5. FIG. 11C depicts a case 0 PDP sample #44 with estimated $(\theta_{AoD}, \theta_{AoA})$: (0,0), and attenuation 47. FIG. 11D depicts a case 6 PDP sample #42 with estimated $(\theta_{AoD}, \theta_{AoA})$: (2,0), and attenuation 55. FIG. 11E depicts a case 6 of PDP sample #43 with estimated $(\theta_{AoD}, \theta_{AoA})$: (0,0), and attenuation 38. FIG. 11F depicts a case 6 of PDP sample #44 with estimated $(\theta_{AoD}, \theta_{AoA})$: (0,0), and attenuation 47.

In these figures RSSI is shown versus antenna pattern combinations for PDP samples #42, #43, and #44 for two example cases of single blocker scenario between the TX and RX. The Y-axis is RSSI, X-axis is pointing angle combinations (PAC), a first curve of each depicts the measurement, while a second curve depicts the simulation. It will be noted that PDP samples #42, #43 and #44 all have the same orientation and RSSI versus PAC pattern. PDP sample #43 is the LOS which provides the ith highest signal power, while samples #42 and #44 are residues of sample #43 due to the filtering effect. It is seen from the figures that LOS and NLOS can be accurately represented using a single sample in omni-PDP.

7. Conclusion

The directional PDPs obtained with phased arrays with irregular beam patterns offered limited information about the characteristics of the multipath components. The present disclosure has shown a methodology to infer multipath characteristics from the directional PDP measurements performed on a mmW phased array. The disclosed angle-of-departure (AoD) and angle-of-arrival (AoA) inference was applied on the extensive measurement data set and it was found that for the typical small room scenario under consideration, the reflections of the side walls offer a significantly useful non line-of-sight (NLOS) path in addition to the line-of-sight (LOS) path. The reflection of the ceiling and floor were found to be insignificant for the environmental geometry under consideration. The loss due to the wall reflection is approximately around 9 to 10 dB. The findings of these tests were also validated using ray tracing simulations, which evidenced the validity of the present disclosure.

8. General Scope of Embodiments

The methods described in the presented technology can be readily implemented within various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating using a directional antenna with at least one other wireless communication circuit; (b) a processor coupled to said wireless communication circuit within a station configured for operating on a wireless network; (c) a non-transitory memory storing instructions executable by the processor; and (d) wherein said instructions, when executed by the processor, perform one or more steps comprising: (d)(i) deriving omni-directional power delay profiles (omni-PDPs) from directional PDP measurements; (d)(ii) inferring multipath characteristics from the directional PDP measurements and inferring angle-of-departure (AoD), angle-of-arrival (AoA) and ray path information from measured channel data to map ray paths toward optimal directions; and (d)(iii) altering antenna configurations in response to measured channel measurements toward reducing path losses.

2. An apparatus for wireless communication in a network, the apparatus comprising: (a) a wireless communication circuit configured for wirelessly communicating using a directional antenna with at least one other wireless communication circuit; (b) a processor coupled to said wireless communication circuit within a station configured for operating on a wireless network; (c) a non-transitory memory storing instructions executable by the processor; and (d) wherein said instructions, when executed by the processor, perform one or more steps comprising: (d)(i) deriving omni-directional power delay profiles (omni-PDPs) from directional PDP measurements, by: (d)(i)(A) finding PDP samples across a range of antenna pattern combinations, among measured power delay profiles (PDPs); (d)(i)(B) aligning the PDP samples with line of sight (LOS) PDP samples and identifying additional signal propagation time (LOS PDP gap) of an NLOS path for that PDP sample compared with the signal propagation time of the LOS path, since sampling time is deterministic wherein the number of PDP samples between a PDP sample and LOS PDP samples represents additional propagation time over an NLOS path for that PDP sample compared with the signal propagation time over an LOS path; and (d)(i)(C) determining an omni-PDP value based on the PDP samples on the same propagation path; (d)(ii) inferring multipath characteristics from the directional PDP measurements and inferring angle-of-departure (AoD), angle-of-arrival (AoA) and ray path information from measured channel data to map ray paths toward optimal directions; and (d)(iii) altering antenna configurations in response to measured channel measurements toward reducing path losses.

3. A method of performing wireless communication in a network and altering antenna configurations in response to measured channel measurements to reduce path losses, the method comprising: (a) deriving omni-directional power delay profiles (omni-PDPs) from directional PDP measurements of a wireless communication station configured for wirelessly communicating using a directional antenna with at least one other wireless communication station; (b) inferring multipath characteristics from the directional PDP measurements and inferring angle-of-departure (AoD), angle-of-arrival (AoA) and ray path information from measured channel data to map ray paths toward optimal directions; and (c) altering antenna configurations in response to measured channel measurements toward reducing path losses.

4. A method of performing wireless communication in a network and altering antenna configurations in response to measured channel measurements to reduce path losses, the method comprising: (a) isolating NLOS rays from measurement and find angle-of-departure, angle-of-arrival and path length; (b) calibrating the material parameters based on the NLOS rays; and (c) comparing between measurement NLOS and calibrated NLOS with a simulation.

5. The apparatus or method of any preceding embodiment, wherein said instructions when executed by the processor further perform one or more steps for deriving omni-PDP comprising: (a) finding PDP samples across a range of antenna pattern combinations, among measured power delay profiles (PDPs); (b) aligning the PDP samples with line of sight (LOS) PDP samples and identifying additional signal propagation time (LOS PDP gap) of an NLOS path for that PDP sample compared with the signal propagation time of the LOS path, since sampling time is deterministic wherein the number of PDP samples between a PDP sample and LOS PDP samples represents additional propagation time over an NLOS path for that PDP sample compared with the signal propagation time over an LOS path; and (c) determining an omni-PDP value based on the PDP samples on the same propagation path.

6. The apparatus or method of any preceding embodiment, wherein said instructions when executed by the processor further perform one or more steps for inferring multipath characteristics comprising determining angle of departure ($\theta_{AoD}$) and angle of arrival ($\theta_{AoA}$) for ray paths.

7. The apparatus or method of any preceding embodiment, wherein said instructions when executed by the processor further perform one or more steps for determining angle of departure ($\theta_{AoD}$) and angle of arrival ($\theta_{AoA}$) for ray paths, comprising one or more steps of: (a) determining each possible combination of $\theta_{AoD}$ and $\theta_{AoA}$ with antenna gains being calculated; (b) comparing antenna gains based on received power measurement across all antenna pattern combinations on each ray path; and (c) selecting an antenna pattern combination which has a minimum difference between ray path and gain as $\theta_{AoD}$ and $\theta_{AoA}$.

8. The apparatus or method of any preceding embodiment, wherein said instructions when executed by the processor further perform one or more steps comprising selecting the antenna pattern combination from a set of representative antenna directions pairs each indicating a specific rotation angle, either positive or negative, at both the transmitter and receiver.

9. The apparatus or method of any preceding embodiment, wherein said instructions when executed by the processor further perform one or more steps comprising storing measured PDP data as a 4D-tensor with dimensions N×Nrx×Ntx×Nscans where N is the number of PDP samples, Nrx and Ntx are the number of TX and RX antenna patterns, and Nscan is the number of repetitive measurements.

10. The apparatus or method of any preceding embodiment, wherein said instructions when executed by the processor perform one or more steps comprising altering antenna configurations in response to measured channel measurements toward reducing path losses based on human blocker situations.

11. The apparatus or method of any preceding embodiment, wherein said wireless communication circuit is configured for operating at millimeter wave (mmWave) frequencies in the range from 30 GHz to 300 GHz.

12. The apparatus or method of any preceding embodiment, wherein said apparatus estimates non-line of sight (NLOS) propagation in various mm-Wave, Wi-Fi, and wireless networking scenarios, and is configured for finding practical alternatives to a line of sight (LOS) path in the event of a communications blockage.

13. The apparatus or method of any preceding embodiment, wherein the deriving of omni-PDP is performed by one or more steps comprising: (a) finding PDP samples across a range of antenna pattern combinations, among measured power delay profiles (PDPs); (b) aligning the PDP samples with line of sight (LOS) PDP samples and identifying additional signal propagation time (LOS PDP gap) of an NLOS path for that PDP sample compared with the signal propagation time of the LOS path, since sampling time is deterministic wherein the number of PDP samples between a PDP sample and LOS PDP samples represents additional propagation time over an NLOS path for that PDP sample compared with the signal propagation time over an LOS path; and (c) determining an omni-PDP value based on the PDP samples on the same propagation path.

14. The apparatus or method of any preceding embodiment, wherein said inferring multipath characteristics is performed by determining angle of departure ($\theta_{AoD}$) and angle of arrival ($\theta_{AoA}$) for ray paths, comprising one or more steps of: (a) determining each possible combination of $\theta_{AoD}$ and $\theta_{AoA}$ with antenna gains being calculated; (b) comparing antenna gains based on received power measurement across all antenna pattern combinations on each ray path; and (c) selecting an antenna pattern combination which has a minimum difference between ray path and gain as $\theta_{AoD}$ and $\theta_{AoA}$.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Estimated ($\theta_{AoD}$, $\theta_{AoA}$) for LOS and NLOS ray paths and time delay for NLOS ray paths with respect to LOS

| Scenario | LOS* | $P_{LOS\ (dBm)}$ | NLOS* | $P_{NLOS\ (dBm)}$ | r(ns) |
|---|---|---|---|---|---|
| TX0 RX0 | (0, 0) | −41.16 | (−30, 40) | −52.02 | 3.2 |
| TX0 RX0 | (0, 0) | −41.31 | (−30, 40) | −51.37 | 3.2 |
| TX0 RX − 61 | (0, 0) | −41.37 | (46, −52) | −58.48 | 7.2 |
| TX0 RX − 61 | (0, 0) | −41.51 | (46, −52) | −59.16 | 7.2 |
| TX0 RX + 65 | (0, 0) | −45.76 | (−41, 39) | −53.45 | 2.4 |
| TX0 RX + 65 | (0, 0) | −45.97 | (−41, 37) | −53.66 | 2.4 |
| TX + 71 RX0 | (0, 0) | −44.56 | (54, −50) | −57.17 | 7.2 |
| TX + 71 RX0 | (0, 0) | −44.99 | (54, −50) | −57.61 | 7.2 |
| TX + 71 RX − 61 | (0, 0) | −46.31 | (54, −47) | −56.46 | 7.2 |
| TX + 71 RX − 61 | (0, 0) | −42.36 | (54, −47) | −56.53 | 7.2 |
| TX − 59 RX0 | (0, 0) | −42.36 | (−34, 37) | −51.84 | 2.4 |
| TX − 59 RX0 | (0, 0) | −43 | (−34, 37) | −52.55 | 2.4 |
| TX − 58 RX + 64 | (0, 0) | −49.51 | (−27, 36) | −52.63 | 2.4 |
| TX − 58 RX + 64 | (0, 0) | −49.57 | (−27, 36) | −52.68 | 2.4 |

*($\theta_{AoD}$, $\theta_{AoA}$)

What is claimed is:

1. An apparatus for wireless communication in a network, the apparatus comprising:
   (a) a wireless communication circuit with a transmitter and receiver configured for wirelessly communicating using a directional antenna with at least one other wireless communication circuit;
   (b) a processor coupled to said wireless communication circuit within a station configured for performing wireless communication in a network;
   (c) a non-transitory memory storing instructions executable by the processor; and
   (d) wherein said instructions, when executed by the processor, perform steps comprising:
      (i) deriving omni-directional power delay profiles (omni-PDPs) from directional PDP measurements;
      (ii) inferring multipath characteristics from the directional PDP measurements and inferring angle-of-departure (AoD), angle-of-arrival (AoA) and ray path information from measured channel data to map ray paths toward optimal directions; and
      (iii) altering antenna configurations in response to measured channel measurements toward reducing path losses based on human blocker situations.

2. The apparatus of claim 1, wherein said instructions when executed by the processor further perform steps for deriving omni-PDP comprising:
 (a) finding PDP samples across a range of antenna pattern combinations, among measured power delay profiles (PDPs);
 (b) aligning the PDP samples with PDP samples for the line of sight (LOS) path and identifying additional signal propagation time (LOS PDP gap) of a non-line of sight (NLOS) path for a PDP sample within said PDP samples compared with the signal propagation time of the LOS path, since sampling time is deterministic wherein the number of PDP samples between a PDP sample and LOS PDP samples represents additional propagation time over the NLOS path for that PDP sample compared with the signal propagation time over the LOS path; and
 (c) determining an omni-PDP value based on the PDP samples on the same propagation path.

3. The apparatus of claim 1, wherein said instructions when executed by the processor further perform steps for inferring multipath characteristics comprising determining angle of departure ($\theta_{AoD}$) and angle of arrival ($\theta_{AoA}$) for ray paths.

4. The apparatus of claim 3, wherein said instructions when executed by the processor further perform steps for determining angle of departure ($\theta_{AoD}$) and angle of arrival ($\theta_{AoA}$) for ray paths, comprising:
 (a) determining each possible combination of $\theta_{AoD}$ and $\theta_{AoA}$ and calculating antenna gains;
 (b) comparing the antenna gains based on received power measurement across all antenna pattern combinations on each ray path; and
 (c) selecting an antenna pattern combination which has a minimum difference between ray path and gain as $\theta_{AoD}$ and $\theta_{AoA}$.

5. The apparatus of claim 4, wherein said instructions when executed by the processor further perform steps comprising selecting the antenna pattern combination from a set of representative antenna direction pairs each indicating a specific rotation angle, either positive or negative, at both the transmitter and receiver.

6. The apparatus of claim 1, wherein said instructions when executed by the processor further perform steps comprising storing measured PDP data as a 4D-tensor with dimensions N×Nrx×Ntx×Nscans where N is the number of PDP samples, Nrx and Ntx are the number of transmit (TX) and receive (RX) antenna patterns, and Nscan is the number of repetitive measurements.

7. The apparatus of claim 1, wherein said wireless communication circuit is configured for operating at millimeter wave (mmWave) frequencies in the range from 30 GHz to 300 GHz.

8. The apparatus of claim 1, wherein said apparatus estimates non-line of sight (NLOS) propagation in various millimeter wave (mmWave), Wi-Fi, and wireless networking, and is configured for finding practical alternatives to a line of sight (LOS) path in the event of a communications blockage.

9. A method of performing wireless communication in a network and altering antenna configurations in response to measured channel measurements to reduce path losses, the method comprising:
 (a) deriving omni-directional power delay profiles (omni-PDPs) from directional PDP measurements of a wireless communication station configured for performing wireless communication in a network using a directional antenna with at least one other wireless communication station;
 (b) inferring multipath characteristics from the directional PDP measurements and inferring angle-of-departure (AoD), angle-of-arrival (AoA) and ray path information from measured channel data to map ray paths toward optimal directions; and
 (c) wherein said inferring multipath characteristics is performed by determining angle of departure ($\theta_{AoD}$) and angle of arrival ($\theta_{AoA}$) for ray paths, comprising steps of: (i) determining each possible combination of $\theta_{AoD}$ and $\theta_{AoA}$ with antenna gains being calculated; (ii) comparing the antenna gains based on received power measurement across all antenna pattern combinations on each ray path; and (iii) selecting an antenna pattern combination which has a minimum difference between ray path and gain as $\theta_{AoD}$ and $\theta_{AoA}$; and
 (d) altering antenna configurations in response to measured channel measurements toward reducing path losses.

10. The method of claim 9, wherein the deriving of omni-PDP is performed by steps comprising:
 (a) finding PDP samples across a range of antenna pattern combinations, among measured power delay profiles (PDPs);
 (b) aligning the PDP samples with PDP samples for the line of sight (LOS) path and identifying additional signal propagation time (LOS PDP gap) of a non-line of sight (NLOS) path for that PDP sample compared with the signal propagation time of the LOS path, since sampling time is deterministic wherein the number of PDP samples between a PDP sample and LOS PDP samples represents additional propagation time over an NLOS path for that PDP sample compared with the signal propagation time over the LOS path; and
 (c) determining an omni-PDP value based on the PDP samples on the same propagation path.

11. An apparatus for wireless communication in a network, the apparatus comprising:
 (a) a wireless communication circuit with a transmitter and receiver configured for wirelessly communicating using a directional antenna with at least one other wireless communication circuit;
 (b) a processor coupled to said wireless communication circuit within a station configured for performing wireless communication in a network;
 (c) a non-transitory memory storing instructions executable by the processor; and
 (d) wherein said instructions, when executed by the processor, perform steps comprising:
  deriving omni-directional power delay profiles (omni-PDPs) from directional PDP measurements;
  (ii) inferring multipath characteristics from the directional PDP measurements and inferring angle-of-departure (AoD), angle-of-arrival (AoA) and ray path information from measured channel data to map ray paths toward optimal directions;
  (iii) altering antenna configurations in response to measured channel measurements toward reducing path losses; and
 (e) wherein said apparatus estimates non-line of sight (NLOS) propagation in various mm-Wave, Wi-Fi, and wireless networking, and is configured for finding practical alternatives to a line of sight (LOS) path in the event of a communications blockage.

12. The apparatus of claim 11, wherein said instructions when executed by the processor further perform steps for deriving omni-PDP comprising:
  (a) finding PDP samples across a range of antenna pattern combinations, among measured power delay profiles (PDPs);
  (b) aligning the PDP samples with PDP samples for the line of sight (LOS) path and identifying additional signal propagation time (LOS PDP gap) of a non-line of sight (NLOS) path for a PDP sample within said PDP samples compared with the signal propagation time of the LOS path, since sampling time is deterministic wherein the number of PDP samples between a PDP sample and LOS PDP samples represents additional propagation time over the NLOS path for that PDP sample compared with the signal propagation time over the LOS path; and
  (c) determining an omni-PDP value based on the PDP samples on the same propagation path.

13. The apparatus of claim 11, wherein said instructions when executed by the processor further perform steps for inferring multipath characteristics comprising determining angle of departure ($\theta_{AoD}$) and angle of arrival ($\theta_{AoA}$) for ray paths.

14. The apparatus of claim 13, wherein said instructions when executed by the processor further perform steps for determining angle of departure ($\theta_{AoD}$) and angle of arrival ($\theta_{AoA}$) for ray paths, comprising:
  (a) determining each possible combination of $\theta_{AoD}$ and $\theta_{AoA}$ with antenna gains being calculated;
  (b) comparing the antenna gains based on received power measurement across all antenna pattern combinations on each ray path; and
  (c) selecting an antenna pattern combination which has a minimum difference between ray path and gain as $\theta_{AoD}$ and $\theta_{AoA}$.

15. The apparatus of claim 14, wherein said instructions when executed by the processor further perform steps comprising selecting the antenna pattern combination from a set of representative antenna direction pairs each indicating a specific rotation angle, either positive or negative, at both the transmitter and receiver.

16. The apparatus of claim 11, wherein said instructions when executed by the processor further perform steps comprising storing measured PDP data as a 4D-tensor with dimensions N×Nrx×Ntx×Nscans where N is the number of PDP samples, Nrx and Ntx are the number of transmit (TX) and receive (RX) antenna patterns, and Nscan is the number of repetitive measurements.

17. The apparatus of claim 11, wherein said instructions when executed by the processor perform steps comprising altering antenna configurations in response to measured channel measurements toward reducing path losses based on human blocker situations.

18. The apparatus of claim 11, wherein said wireless communication circuit is configured for operating at millimeter wave (mmWave) frequencies in the range from 30 GHz to 300 GHz.

19. An apparatus for wireless communication in a network, the apparatus comprising:
  (a) a wireless communication circuit with a transmitter and receiver configured for wirelessly communicating using a directional antenna with at least one other wireless communication circuit;
  (b) a processor coupled to said wireless communication circuit within a station configured for performing wireless communication in a network;
  (c) a non-transitory memory storing instructions executable by the processor; and
  (d) wherein said instructions, when executed by the processor, perform steps comprising:
    (i) deriving omni-directional power delay profiles (omni-PDPs) from directional PDP measurements;
    (ii) inferring multipath characteristics from the directional PDP measurements and inferring angle-of-departure (AoD), angle-of-arrival (AoA) and ray path information from measured channel data to map ray paths toward optimal directions;
    (iii) storing measured PDP data as a 4D-tensor with dimensions N×Nrx×Ntx×Nscans where N is the number of PDP samples, Nrx and Ntx are the number of TX and RX antenna patterns, and Nscan is the number of repetitive measurements; and
    (iv) altering antenna configurations in response to measured channel measurements toward reducing path losses.

20. The apparatus of claim 19, wherein said instructions when executed by the processor further perform steps for deriving omni-PDP comprising:
  (a) finding PDP samples across a range of antenna pattern combinations, among measured power delay profiles (PDPs);
  (b) aligning the PDP samples with PDP samples for the line of sight (LOS) path and identifying additional signal propagation time (LOS PDP gap) of a non-line of sight (NLOS) path for a PDP sample within said PDP samples compared with the signal propagation time of the LOS path, since sampling time is deterministic wherein the number of PDP samples between a PDP sample and LOS PDP samples represents additional propagation time over the NLOS path for that PDP sample compared with the signal propagation time over the LOS path; and
  (c) determining an omni-PDP value based on the PDP samples on the same propagation path.

21. The apparatus of claim 19, wherein said instructions when executed by the processor further perform steps for inferring multipath characteristics comprising determining angle of departure ($\theta_{AoD}$) and angle of arrival ($\theta_{AoA}$) for ray paths.

22. The apparatus of claim 21, wherein said instructions when executed by the processor further perform steps for determining angle of departure ($\theta_{AoD}$) and angle of arrival ($\theta_{AoA}$) for ray paths, comprising:
  (a) determining each possible combination of $\theta_{AoD}$ and $\theta_{AoA}$ and calculating antenna gains;
  (b) comparing the antenna gains based on received power measurement across all antenna pattern combinations on each ray path; and
  (c) selecting an antenna pattern combination which has a minimum difference between ray path and gain as $\theta_{AoD}$ and $\theta_{AoA}$.

23. The apparatus of claim 22, wherein said instructions when executed by the processor further perform steps comprising selecting the antenna pattern combination from a set of representative antenna direction pairs each indicating a specific rotation angle, either positive or negative, at both the transmitter and receiver.

24. The apparatus of claim 19, wherein said instructions when executed by the processor perform steps comprising altering antenna configurations in response to measured channel measurements toward reducing path losses based on human blocker situations.

25. The apparatus of claim 19, wherein said wireless communication circuit is configured for operating at millimeter wave (mmWave) frequencies in the range from 30 GHz to 300 GHz.

26. The apparatus of claim 19, wherein said apparatus estimates non-line of sight (NLOS) propagation in various millimeter wave (mmWave), Wi-Fi, and wireless networking, and is configured for finding practical alternatives to a line of sight (LOS) path in the event of a communications blockage.

27. An apparatus for wireless communication in a network, the apparatus comprising:
  (a) a wireless communication circuit with a transmitter and receiver configured for wirelessly communicating using a directional antenna with at least one other wireless communication circuit;
  (b) a processor coupled to said wireless communication circuit within a station configured for performing wireless communication in a network;
  (c) a non-transitory memory storing instructions executable by the processor; and
  (d) wherein said instructions, when executed by the processor, perform steps comprising:
    (i) deriving omni-directional power delay profiles (omni-PDPs) from directional PDP measurements;
    (ii) inferring multipath characteristics from the directional PDP measurements and inferring angle-of-departure (AoD), angle-of-arrival (AoA) and ray path information from measured channel data to map ray paths toward optimal directions;
    (iii) wherein inferring multipath characteristics comprises determining angle of departure ($\theta_{AoD}$) and angle of arrival ($\theta_{AoA}$) for ray paths, comprising: (A) determining each possible combination of $\theta_{AoD}$ and $\theta_{AoA}$ with antenna gains being calculated; (B) comparing the antenna gains based on received power measurement across all antenna pattern combinations on each ray path; and (C) selecting an antenna pattern combination which has a minimum difference between ray path and gain as $\theta_{AoD}$ and $\theta_{AoA}$; and
    (iv) altering antenna configurations in response to measured channel measurements toward reducing path losses.

28. The apparatus of claim 27, wherein said instructions when executed by the processor further perform steps for deriving omni-PDP comprising:
  (a) finding PDP samples across a range of antenna pattern combinations, among measured power delay profiles (PDPs);
  (b) aligning the PDP samples with PDP samples for the line of sight (LOS) path and identifying additional signal propagation time (LOS PDP gap) of a non-line of sight (NLOS) path for a PDP sample within said PDP samples compared with the signal propagation time of the LOS path, since sampling time is deterministic wherein the number of PDP samples between a PDP sample and LOS PDP samples represents additional propagation time over the NLOS path for that PDP sample compared with the signal propagation time over the LOS path; and
  (c) determining an omni-PDP value based on the PDP samples on the same propagation path.

29. The apparatus of claim 27, wherein said instructions when executed by the processor further perform steps comprising selecting the antenna pattern combination from a set of representative antenna direction pairs each indicating a specific rotation angle, either positive or negative, at both the transmitter and receiver.

30. The apparatus of claim 27, wherein said instructions when executed by the processor further perform steps comprising storing measured PDP data as a 4D-tensor with dimensions N×Nrx×Ntx×Nscans where N is the number of PDP samples, Nrx and Ntx are the number of TX and RX antenna patterns, and Nscan is the number of repetitive measurements.

31. The apparatus of claim 27, wherein said instructions when executed by the processor perform steps comprising altering antenna configurations in response to measured channel measurements toward reducing path losses based on human blocker situations.

32. The apparatus of claim 27, wherein said wireless communication circuit is configured for operating at millimeter wave (mmWave) frequencies in the range from 30 GHz to 300 GHz.

33. The apparatus of claim 27, wherein said apparatus estimates non-line of sight (NLOS) propagation in various millimeter wave (mmWave), Wi-Fi, and wireless networking, and is configured for finding practical alternatives to a line of sight (LOS) path in the event of a communications blockage.

34. An apparatus for wireless communication in a network, the apparatus comprising:
  (a) a wireless communication circuit with a transmitter and receiver configured for wirelessly communicating using a directional antenna with at least one other wireless communication circuit;
  (b) a processor coupled to said wireless communication circuit within a station configured for performing wireless communication in a network;
  (c) a non-transitory memory storing instructions executable by the processor; and
  (d) wherein said instructions, when executed by the processor, perform steps comprising:
    (i) deriving omni-directional power delay profiles (omni-PDPs) from directional PDP measurements by steps comprising: (A) finding PDP samples across a range of antenna pattern combinations, among measured power delay profiles (PDPs); (B) aligning the PDP samples with PDP samples for the line of sight (LOS) path and identifying additional signal propagation time (LOS PDP gap) of a non-line of sight (NLOS) path for a PDP sample within said PDP samples compared with the signal propagation time of the LOS path, since sampling time is deterministic wherein the number of PDP samples between a PDP sample and LOS PDP samples represents additional propagation time over the NLOS path for that PDP sample compared with the signal propagation time over the LOS path; and (C) determining an omni-PDP value based on the PDP samples on the same propagation path;
    (ii) inferring multipath characteristics from the directional PDP measurements and inferring angle-of-departure (AoD), angle-of-arrival (AoA) and ray path information from measured channel data to map ray paths toward optimal directions; and
    (iii) altering antenna configurations in response to measured channel measurements toward reducing path losses.

35. The apparatus of claim 34, wherein said instructions when executed by the processor further perform steps for inferring multipath characteristics comprising determining angle of departure ($\theta_{AoD}$) and angle of arrival ($\theta_{AoA}$) for ray paths.

36. The apparatus of claim 35, wherein said instructions when executed by the processor further perform steps for determining angle of departure ($\theta_{AoD}$) and angle of arrival ($\theta_{AoA}$) for ray paths, comprising:
  (a) determining each possible combination of $\theta_{AoD}$ and $\theta_{AoA}$ with antenna gains being calculated;
  (b) comparing the antenna gains based on received power measurement across all antenna pattern combinations on each ray path; and
  (c) selecting an antenna pattern combination which has a minimum difference between ray path and gain as $\theta_{AoD}$ and $\theta_{AoA}$.

37. The apparatus of claim 36, wherein said instructions when executed by the processor further perform steps comprising selecting the antenna pattern combination from a set of representative antenna direction pairs each indicating a specific rotation angle, either positive or negative, at both the transmitter and receiver.

38. The apparatus of claim 34, wherein said instructions when executed by the processor further perform steps comprising storing measured PDP data as a 4D-tensor with dimensions N×Nrx×Ntx×Nscans where N is the number of PDP samples, Nrx and Ntx are the number of transmit (TX) and receive (RX) antenna patterns, and Nscan is the number of repetitive measurements.

39. The apparatus of claim 34, wherein said instructions when executed by the processor perform steps comprising altering antenna configurations in response to measured channel measurements toward reducing path losses based on human blocker situations.

40. The apparatus of claim 34, wherein said wireless communication circuit is configured for operating at millimeter wave (mmWave) frequencies in the range from 30 GHz to 300 GHz.

41. The apparatus of claim 34, wherein said apparatus estimates non-line of sight (NLOS) propagation in various millimeter wave (mmWave), Wi-Fi, and wireless networking, and is configured for finding practical alternatives to a line of sight (LOS) path in the event of a communications blockage.

* * * * *